Patented Dec. 20, 1932

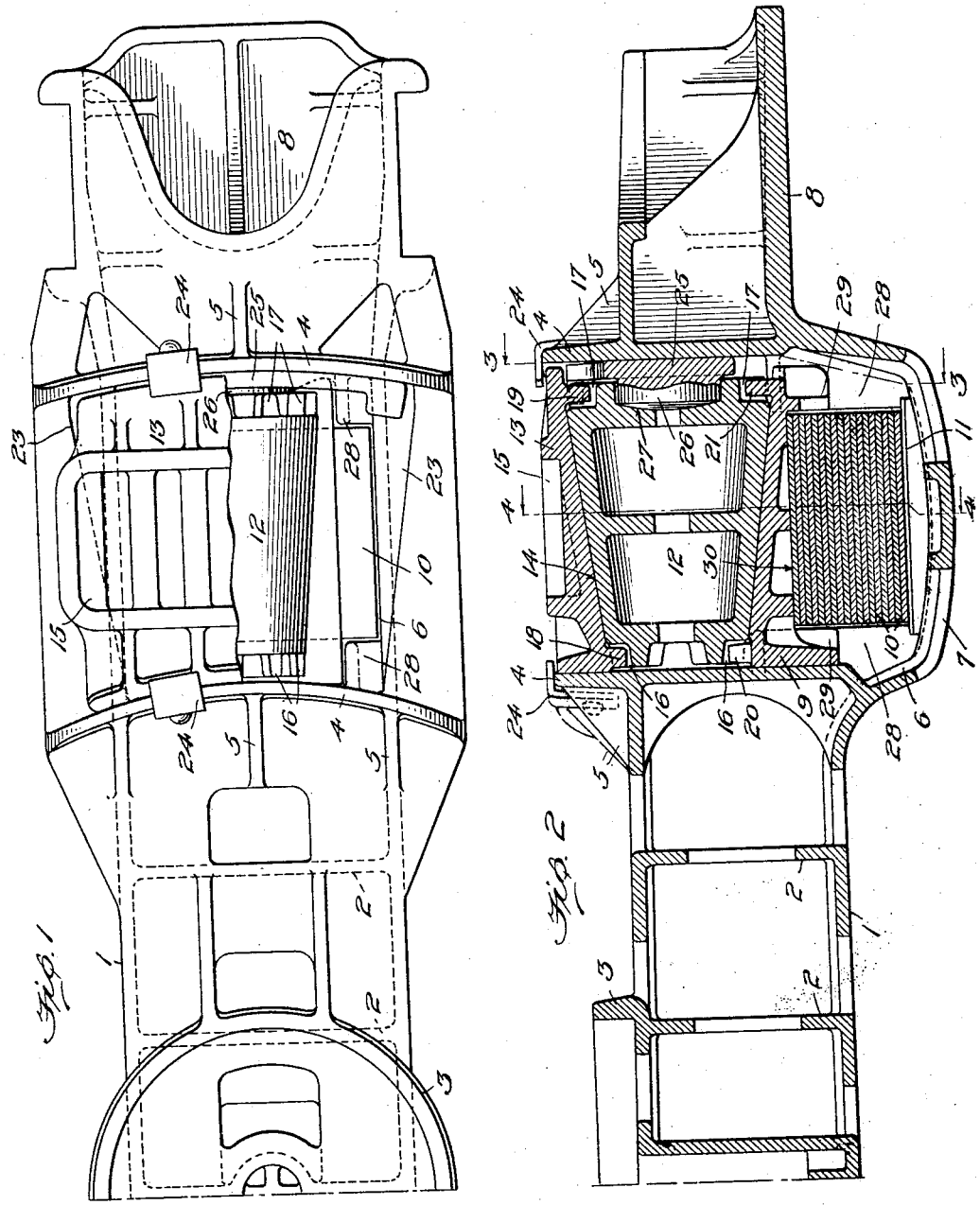

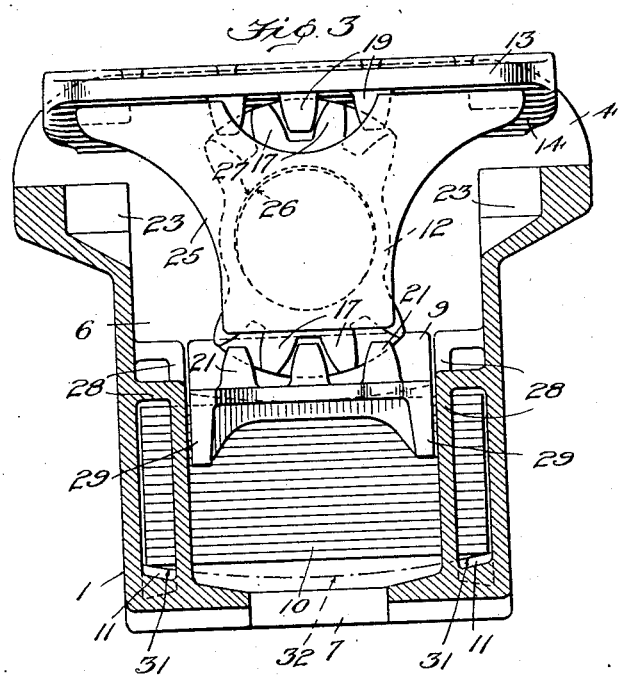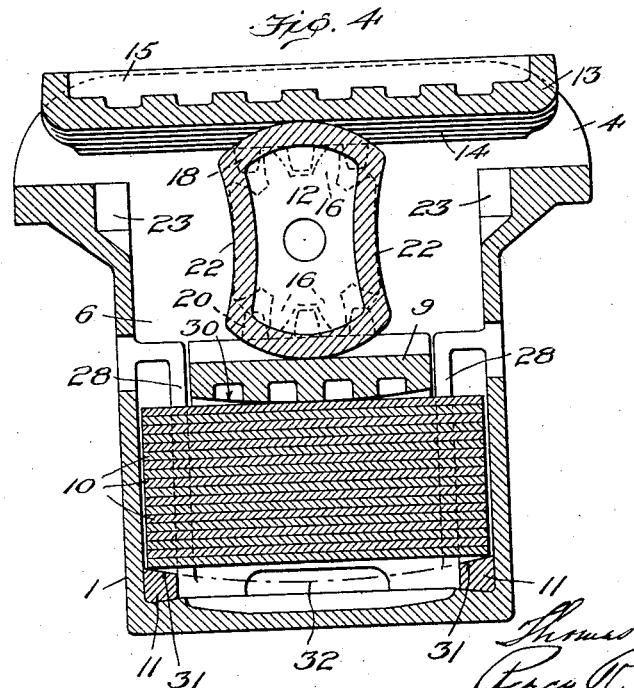

1,891,583

UNITED STATES PATENT OFFICE

THOMAS H. SYMINGTON AND PERCY R. DRENNING, OF BALTIMORE, MARYLAND, ASSIGNORS, BY MESNE ASSIGNMENTS, TO T. H. SYMINGTON AND SON, INC., OF BALTIMORE, MARYLAND, A CORPORATION OF MARYLAND

TRUCK BOLSTER

Application filed April 9, 1926. Serial No. 100,943.

The invention relates to bolsters for railway car trucks.

The primary object of the invention, generally stated, is to provide a truck bolster having side bearings so formed, mounted and arranged as to take the weight of the load instead of the load coming upon a center bearing as is the common practice.

An important object of the invention is to provide a truck bolster and side bearing mechanism thereon for coaction with the side bearing elements which depend from the car body bolster, the taking of the weight on the side bearings being of material advantage in reducing or eliminating roll of the car body in addition to reducing the bending moment in the truck bolster, so that the weight may be reduced, the decrease in the bending moment consequently reducing the working stress.

It is well known that in the conventional type of bolster and bearing construction, the weight of the car body is borne upon the center bearings, there being a certain amount of clearance between the side bearings on the truck bolster and the coacting depending elements on the car body bolster. During car travel, any slight inequalities in the tracks and the passage of the car wheels over the successive rail joints will develop a side sway or roll which may, in case of synchronization with the passage of the wheels over the rail joints at certain speeds, result in a pendulum-like movement which becomes excessive and which may cause the truck wheels to leave the tracks.

It is with the above facts in view that we have designed the present invention which has for its more specific object the provision of a side bearing structure which will always sustain the load, the bearing elements on the truck bolster remaining constantly in contact with the elements depending from the car body bolster, there being consequently no clearance at these points and therefore no likelihood or even possibility of developing a dangerous car roll.

Another object of the invention is to provide a truck bolster in which the side bearings embody or include rollers engaged by top wear plates so constructed as to receive the depending bearing elements of the car body bolster, the provision of the rollers permitting swivelling movement of the trucks with respect to the car body without undue wear and insuring flexibility.

Another object of the invention is to provide a structure of this character in which the side bearing rollers may have toothed or interfitting relation with the adjacent bearing elements engaged thereby for insuring centering and return of the parts to normal position after swiveling movement of the truck with respect to the car body.

Another important object of the invention is to provide a bolster and bearing structure in which leaf springs may be provided beneath the side bearings for increasing the ultimate resistance of existing bolster springs and thereby relieving the side frames, journals, rails and roadbed of serious dynamic blows, compression in the leaf springs acting to provide cross equalization for the car body, the wheel loads on the rail being equalized and occurrence of light wheel loads prevented.

An additional object of the invention is the provision of a bolster and side bearing structure which may embody leaf springs cushioning the side bearings, the springs possessing an absorption value and preferably having a different period of oscillation than the existing truck coil springs and consequently eliminating vertical "jiggle" and reducing car roll.

Still another object of the invention is to provide a bolster embodying the above mentioned structural characteristics and, in addition, being capable of replacing the present types of bolsters, it being consequently possible to install the new equipment without necessitating alteration of the cars or trucks, the bolster being, moreover, of such construction that all the working parts are retained therewithin, facilitating shipping, handling and assembly and avoiding loss of parts in wrecks.

To the attainment of the foregoing and other objects and advantages which will be made apparent as the description progresses, the invention preferably consists in the construction, arrangement and combination of parts to be hereinafter more fully described and claimed, and illustrated in the accompanying drawings in which:

Figure 1 is a plan view, partly broken away, of one end of a bolster and side bearing structure embodying the invention, Figure 2 is a central vertical longitudinal section, Figure 3 is a vertical cross section taken on substantially the line 3—3 of Figure 2, Figure 4 is a vertical cross section taken on substantially the line 4—4 of Figure 1.

Referring more particularly to the drawings the numeral 1 designates the body of the truck bolster which is of hollow formation and which may be constructed as a casting, pressing or the like and provided with any suitable or desired number of reinforcing webs or elements 2. At the center of the upper surface of the bolster there is provided a circular flange 3 at the place usually occupied by the customary center bearing though, as will be hereinafter pointed out, no weight comes upon the bolster at this point. Beyond its center and its outer ends, the bolster is provided with upstanding flanges 4 of arcuate shape, concentric with the vertical axis of the body of the bolster and braced or reinforced by webs 5. The body of the bolster is also formed with a pocket 6 defined between the flanges 4 and extending throughout the height, this pocket being of a preferably arcuate shape corresponding to the space between the flanges. The bottom of the pocket is closed except for openings 7 provided for the escape of any water, snow or other foreign matter which may enter, while the top is entirely open. The pocket 6 is located inwardly of the end to a sufficient extent that the end portion 8 may be accommodated within the side frame in the usual manner without any interference whatsoever.

Mounted within each pocket 6 is a bearing member 9 supported, in one form of the invention, by a plurality of spring plates or leaves 10 arranged in one or more banks as may be found preferable. The underside of the member 9 is represented as recessed or otherwise formed to embracingly receive and accommodate the upper portion of the bank or banks of springs, and located at opposite sides of the bottom of the pocket are, preferably, supporting elements 11 upon which the ends of the springs rest, though it is conceivable that they might be supported directly by portions of the pocket. The upper surface of the member 9 is inclined so as to form a suitable seat for a frusto-conical roller 12, here represented as of hollow formation, principally for the sake of lightness. Supported upon the roller is a bearing member 13 having an inclined lower surface 14 conforming thereto and provided in its top with a socket or recessed portion 15 for the accommodation of the depending side bearing element, not shown, carried by the car body bolster and forming part of the regular equipment. The member 13 is of arcuate shape so as to fit properly, but with some clearance, between the flanges 4. It is intended that the member 13 be movable in a path concentric with the vertical axis of the truck bolster, and to insure return of the parts to normal position after any movement that may occur, the roller is preferably provided at its ends with teeth 16 and 17 meshing with teeth 18 and 19 respectively, on the underside of the member 13. The bearing member 9 is also preferably provided at its opposite ends with teeth 20 and 21 with which the teeth 16 and 17 mesh. It will of course be understood that when the body bolster swivels or rotates with respect to the truck bolster, the teeth 18 and 19 on the former interfitting with the teeth 16 and 17 on the rollers will cause these rollers to turn and to roll with respect to the bearing members in the truck bolster, the teeth 16 and 17 at the bottom of the rollers interfitting with the teeth 20 and 21 so that the rollers cannot slip or slide with respect to the lower bearing members but will always remain in a certain definite relation to the body and truck bolsters. Upon the cessation of the force tending to rotate or swivel the bolsters the body bolster will naturally return to its normal position registering or alining with the truck bolster and the interfitting teeth at the top and bottom of the rollers and on the body bolster and bearing member will cause the rollers to return to their normal or central positions. If these teeth were not provided it is conceivable that the rollers might shift laterally with respect to the truck and body bolsters. By the present arrangement it is clear that there is the equivalent of a rack and gear movement so that there is no possibility of dislocation or derangement of the parts. The cross sectional configuration of the roller 12 is, more or less, immaterial though, in the present instance, it is represented as having its opposite sides cut away and preferably concaved, as shown at 22 so as to permit considerable rocking movement of the roller without striking against the opposite sides of the body of the bolster. In Figures 3 and 4, it will be observed that the opposite sides of the bolster are recessed at 23 for the accommodation of the edges of the roller during its rocking movement. By this particular construction it will be clear that the bolster may be made comparatively narrow while still permitting the necessary and proper rocking movement.

Of course the springs 10 may be placed under initial compression and to maintain this, while the bolster is out of the car truck, we may, if desired, provide stop brackets 24 or the like secured to the body of the bolster at convenient points, such, as for instance, upon the flanges 4, these brackets overlying the flanges and extending over the member 13 to a sufficient extent to restrain it against upward movement under the expansive influence of the springs. By virtue of this arrangement, it will be seen that the parts may be assembled and will be held together so that the bolster will constitute a complete entity or assembly ready to be installed to take the place of ordinary equipment.

Obviously, there is bound to be an outward end thrust on the rollers 12, for which reason we have provided wear plates 25 located within the pockets 6 against the outer walls thereof, these wear plates being preferably formed with bosses 26 which fit within in recesses 27 in the outer ends of the rollers. Owing to the relatively large area of these wear plates it should be understood that the frictional resistance between the outer ends of the rollers and the adjacent walls of the pockets, or the strain of the end thrust, will be distributed throughout a comparatively large area instead of being concentrated or localized, the distribution naturally acting to prevent the bringing of undue strain or stress upon any particular spot. Long life of the parts should therefore be assured.

Within the pocket 6 and formed on the opposite sides thereof we preferably provide webs 28 which serve as means for maintaining the bank or banks of springs in place so that lateral shifting thereof cannot occur. The recessing of the underside of the member 9 provides guide webs 29 which are for the purpose of maintaining the member 9 in proper relation to the springs. Attention is directed to the fact that the bottom 30 of the member 9, where it engages the uppermost spring leaf or plate, is convex. The members 11 are located at the lower corners of the pocket 6 and their upper surfaces 31 are inclined or curved from the outer edges downwardly toward the center of the bottom of the bolster so that only the ends of the lowermost spring leaf or plate will be in engagement with the members 11 under light load conditions. When a downward thrust upon the side bearing occurs, it is clear that the resultant downward movement of the member 9 will cause the spring leaves or plates to flex downwardly as indicated by the dot and dash line 32 in Figures 3 and 4, thus providing resilience in addition to that resulting from the employment of the usual truck springs. As the lower surface of the member 9 is convex the flexing strain on the spring leaves or plates will be concentrated at the center until the springs have given or flexed downwardly to such an extent that practically the entire area of the underside of the member 9 bears conformingly against the uppermost leaf or plate. The provision of these springs auxiliary to the regular truck springs will be of manifest advantage in absorbing any hammerlike blows which might otherwise come upon the parts and danger of injury to any of the mechanism will be greatly reduced.

In view of the foregoing, it will be seen that we have disclosed means whereby the weight of the car and all forces will be sustained by the side bearings alone instead of by center bearings as is the ordinary practice, the means including rollers which permit relative movement of the body bolster and truck bolster, the rollers being, moreover, preferably shaped to have their natural paths correspond to the path of movement of the side bearing elements which depend from the body bolster, swiveling movement being thereby facilitated. In that auxiliary springs are provided as part of the side bearing structure, it is clear that the ultimate resistance of existing truck springs will be increased, thereby relieving the side frames, journals, wheels, rails and roadbed of serious dynamic blows. The compression in the leaf springs will act as cross equalization for the car body, thereby equalizing wheel loads on the rails and preventing the occurrence of light wheel loads. It is preferable that the leaf springs, having absorption qualities, have a different period of oscillation from that of the existing truck coil springs to eliminate vertical "jiggle" and reduce car roll.

While we have shown and described a preferred form of the invention, it should be understood that the disclosure is merely an exemplification of the possibilities inasmuch as various changes and variations may be resorted to under many different circumstances. We wish it understood that we reserve the right to make all such modifications in the details of construction and the arrangement and combination of parts provided such changes constitute no departure from the spirit of the invention or the scope of the claims hereunto appended.

Having thus described the invention, we claim:

1. A railway truck bolster having a pocket therein, a roller mounted within the pocket and capable of movement laterally of the bolster, means engaging the roller for coaction with side bearing elements of a body bolster, means normally maintaining the roller in centered relation to the bolster, and thrust means at the outer end of the roller and carried thereby.

2. The combination with a railway body bolster having side bearing elements, of a truck bolster having a pocket structure therein, a roller located within said pocket structure, a member bearing on the roller and coacting with the side bearing elements of the body bolster, means coacting with the roller for normally maintaining it and said member in centered relation, and thrust take-up means between the outer end of the roller and the adjacent wall of the pocket.

3. The combination with a railway body bolster having side bearing elements, of a truck bolster having a pocket structure therein, a support within the pocket, a roller located within said pocket structure, a member bearing on the roller and movable with the side bearing elements of the body bolster, means on the support and member coacting with the roller for normally maintaining the support, member and roller in centered relation, and thrust take-up means carried by the outer end of the roller and bearing against the outer wall of the pocket.

4. In a railway car, the combination with a body bolster having depending side bearing elements, of a truck bolster having a pocket therein, a supporting member located within the pocket, a roller mounted on the supporting member, a bearing member mounted upon the roller and formed to receive the depending bearing element of the body bolster, said bolsters being capable of relative swiveling movement, means normally maintaining the supporting member, bearing member and roller in centered relation to each other, and thrust take-up means recessed into the outer end of the roller and bearing against the outer wall of the pocket.

5. A railway truck bolster comprising a hollow body having an arcuate pocket therein concentric with the vertical axis of the bolster, a support within the pocket, a roller movably mounted upon the support, a bearing member engaged upon the roller and movable along the arcuate pocket and adapted for cooperation with side bearing elements of a body bolster, a thrust receiving member carried by the outer end of the roller, and guide means for said thrust receiving member.

6. A railway truck bolster comprising a hollow body having an arcuate pocket therein concentric with the vertical axis of the bolster, a support within the pocket, a roller movably mounted upon the support, a bearing member engaged upon the roller and movable along the arcuate pocket and adapted for cooperation with side bearing elements of a body bolster, means normally maintaining the roller in a central position with respect to the pocket, thrust means carried by the outer end of the roller, and guide means on said thrust means cooperating with said bearing member.

7. A railway truck bolster comprising a hollow body having an arcuate pocket therein concentric with the vertical axis of the bolster, a support within the pocket, a roller movably mounted upon the support, a bearing member engaged upon the roller and movable along the arcuate pocket and adapted for cooperation with side bearing elements of a body bolster, and means normally maintaining the roller in a central position with respect to the pocket, said means acting also to return the roller and bearing member to central position subsequent to movement, and said means having its major portion located within the pocket 8. A railway truck bolster having a pocket therein, a supporting member within the pocket having an inclined face, a tapered roller movable upon said supporting member, a bearing member engaged upon the roller and having an inclined face, said bearing member being adapted for the reception of a side bearing element carried by a body bolster, said pocket being of arcuate shape concentric with the vertical axis of the bolster and conforming to the path of movement of the roller, said bearing member being located within the pocket.

9. A railway truck bolster having a pocket therein, a supporting member within the pocket having an inclined face, a tapered roller movable upon said supporting member, a bearing member located within the pocket engaged upon the roller and having an inclined face, said bearing member being recessed for the reception of a side bearing element carried by a body bolster, said pocket being of arcuate shape concentric with the vertical axis of the bolster and conforming to the path of movement of the roller, and coacting means on the supporting member, bearing member and roller for restoring the parts to centered position subsequent to movement.

10. A railway car truck bolster formed with a transversely extending arcuate pocket, and a side bearing structure located within the pocket and including a support, a roller movable along the support transversely of the bolster in an arcuate path, and a bearing member mounted upon the roller and movable along the pocket in contact with one wall thereof, said last named member being shaped to conform to the pocket.

11. A railway car truck bolster provided with spaced wall members defining a pocket, and a side bearing structure mounted within the pocket and including a lower support, a roller movably mounted thereon, an upper support mounted on the roller, and coacting teeth on the roller and both supports, said upper support having a recess therein conformingly receiving a depending body bearing element fixed upon the body bolster.

12. A railway car truck bolster provided with spaced walls defining a transverse pocket, and a side bearing structure mounted within the pocket and including upper and lower supporting members and a roller movably mounted between the same, and a wear take-up member interposed between the outer end of the roller and the adjacent wall of the pocket.

13. A railway car truck bolster provided with spaced walls defining a transverse pocket, and a side bearing structure mounted within the pocket and including upper and lower supporting members and a roller movably mounted between the same, and a wear take-up member interposed between the outer end of the roller and the adjacent wall of the pocket, the take-up member including a plate portion having a boss thereon, the outer end of the roller having a socket receiving the boss.

14. A railway car truck bolster provided with a pocket extending transversely thereof, a supporting member located within the pocket, a roller mounted on said supporting member, spring means located beneath the supporting member for urging it upwardly, and means at the top of the pocket for holding said parts assembled.

15. A railway car truck bolster provided with a pocket extending transversely thereof, a supporting member located within the pocket, a roller mounted on said supporting member, spring means located beneath the supporting member for urging it upwardly, the spring means including a plurality of spring plates arranged in superposed relation, and removable supports for the ends of the spring means.

16. A railway car truck bolster provided with a pocket and a side bearing structure mounted therein including upper and lower supports, a roller interposed therebetween, a bank of spring plates located beneath the lower support and supported only at their ends, the lower surface of the lower support being convexed and engaging the uppermost one of the spring plates.

17. A railway car truck bolster formed with a pocket and provided with guide webs extending inwardly from the side walls thereof, a supporting member mounted within the pocket, a bank of leaf springs located within the pocket between said guide webs and located beneath said supporting member, a bearing member, and a roller located between the supporting member and the bearing member, said springs being maintained normally under initial compression.

18. A railway car truck bolster formed with a pocket and provided with guide webs extending inwardly from the side walls thereof, a supporting member mounted within the pocket, a bank of leaf springs located within the pocket between said guide webs and located beneath said supporting member, a bearing member, a roller located between the supporting member and the bearing member, said springs being maintained normally under initial compression, and means overlying the pocket and the bearing member for preventing displacement thereof under the expansive action of the springs.

In testimony whereof we affix our signatures.

THOMAS H. SYMINGTON.
PERCY R. DRENNING.